No. 12,733. REISSUED DEC. 17, 1907.
B. A. STOCKING & H. MENDENHALL.
WASHING MACHINE.
APPLICATION FILED FEB. 14, 1905.
2 SHEETS—SHEET 1.
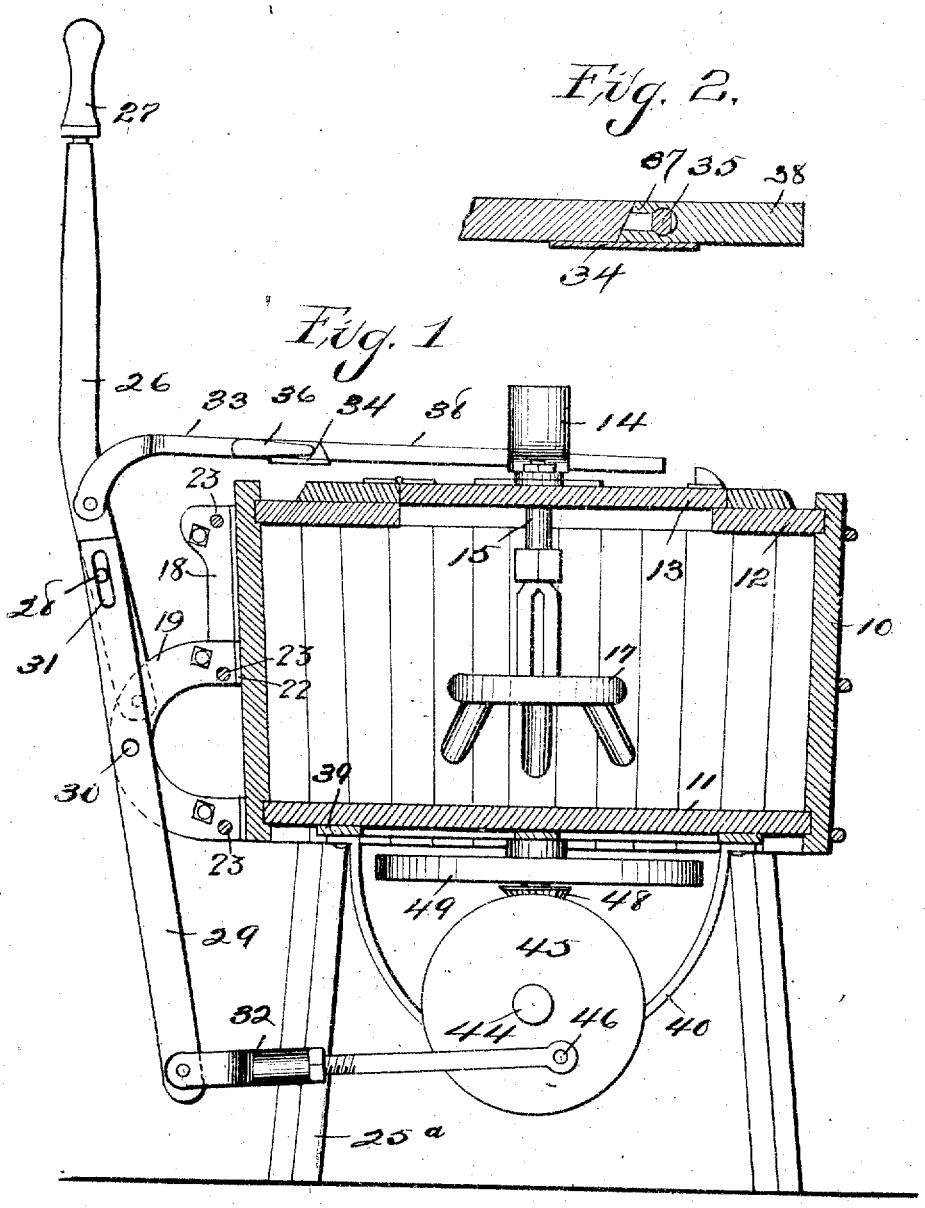
Attest. Inventors B. A. Stocking and H. Mendenhall
J. B. Smutney
R. B. Owing by Owing & Lane Attys.

No. 12,733. REISSUED DEC. 17, 1907.

B. A. STOCKING & H. MENDENHALL.

WASHING MACHINE.

APPLICATION FILED FEB. 14, 1905.

2 SHEETS—SHEET 2

Attest:

J. B. Smutney.

R. B. Ennis

Inventors B. A. Stocking and H. Mendenhall by Ennis & Lane Attys

UNITED STATES PATENT OFFICE.

BERT A. STOCKING AND HIRAM MENDENHALL, OF AUDUBON, IOWA.

WASHING-MACHINE.

No. 12,733. Specification of Reissued Letters Patent. Reissued Dec. 17, 1907.

Original No. 762,851, dated June 14, 1904, Serial No. 164,416. Application for reissue filed February 14, 1905. Serial No. 245,626.

*To all whom it may concern:*

Be it known that we, BERT A. STOCKING and HIRAM MENDENHALL, citizens of the United States, residing at Audubon, in the county of Audubon and State of Iowa, have invented a certain new and useful Washing-Machine, of which the following is a specification.

Our invention relates to that class of washing machines designed to be manually operated and easily transported.

Our object is to provide means by which the power applied by the operator to run the agitator may be applied in a convenient and easy manner for the operator and power may be applied to the operating lever during any desired part of the lever movement and the remainder of the stroke of the operating lever will be completed by the action of the momentum of the balance wheel.

A further object is to provide a machine of this class of compact form; balanced in such a manner that it may be easily carried or shifted from place to place and the interior of the tub be readily accessible.

Our invention consists in the construction, arrangement and combination of the various parts of the device, whereby the objects contemplated are attained, as hereinafter more fully set forth, pointed out in our claims and illustrated in the accompanying drawings, in which:—

Figure 3:
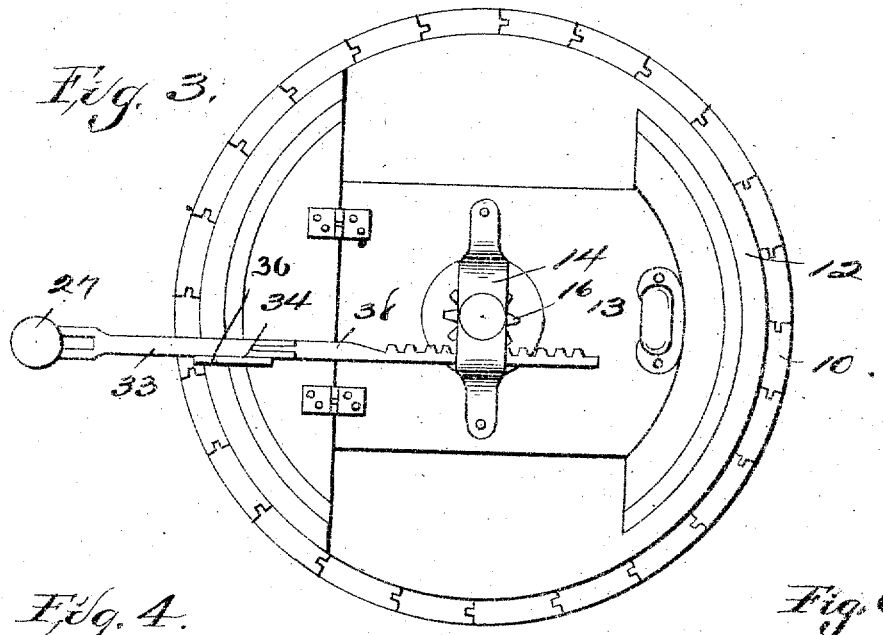
Figure 4:
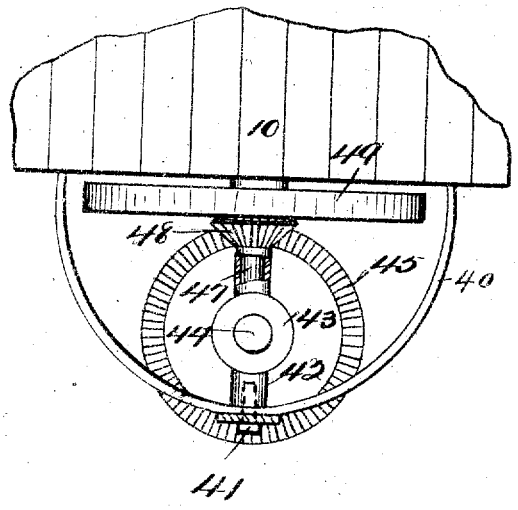
Figure 5:
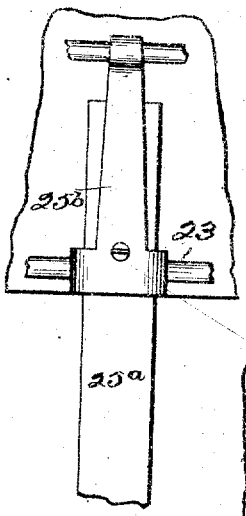
Figure 6:
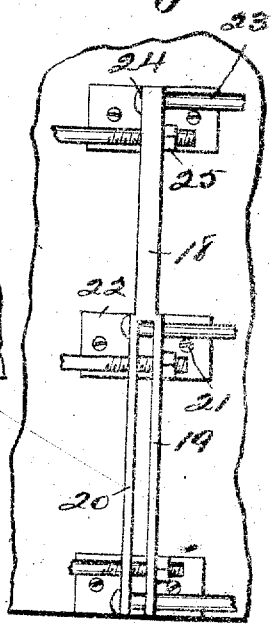

Figure 1 shows a side elevation of the washing machine with the tub in vertical section. Fig. 2 shows an enlarged detail section view illustrating the means for connecting the inner and outer portions of the rack-bar together. Fig. 3 shows a plan view of the washing machine. Fig. 4 shows a detail side view illustrating a portion of the tub, the balance-wheel and the means for driving the balance-wheel the rods running around the tub being omitted. Fig. 5 shows a detail view of a part of the tub illustrating the means for securing one of the supporting legs, and Fig. 6 shows a detail side view illustrating the bracket to which the tub-binding rods are attached and which is designed to receive the operating levers.

Referring to the accompanying drawings, we have used the reference numeral 10 to indicate the tub proper, formed with a solid bottom 11 and with a top 12 provided with an opening through which access is had to the interior of the tub, which opening is normally closed by the hinged cover section 13 secured to the top. Fixed to the top of the hinged cover section is a bracket 14 in which we have rotatably mounted the vertical shaft 15, said shaft has fixed to it above the cover a pinion 16 and below the cover is the agitator 17. Mounted on the side of the tub adjacent to the hinged portion of the cover 13 is a bracket comprising a body portion 18 and two segmental outwardly projecting portions 19 and 20. This bracket is secured to the tub by means of a screw 21 passed through the plate 22 of the bracket.

We have provided for binding the tub staves together as follows: 23 indicate rods, each having a head 24 designed to engage one side of the bracket 18. The rod is passed through the bracket, around the tub and then its other end is again passed through the bracket and a nut 25 screwed thereon engaging the side of the bracket opposite from the side engaged by the head 24. By adjusting the nuts 25, the said rods may be tightened or loosened, as desired, and when the rods are in proper position, the staves of the tub will be firmly bound together thereby. Thus the bracket serves to aid in securing the staves of the tub together and the rods 23 serve to aid in retaining the bracket in position. The legs of the tub are indicated by the symbol $25^a$ and are secured to the outer surface of the tub by the brackets $25^b$. These brackets have the rods 23 passed through them. Thus the brackets serve to brace the rods and the rods serve to retain the brackets in position.

The operating lever is indicated by the reference numeral 26 and its lower end is inserted between the parts 19 and 20 of the bracket and is pivoted therein. A handle 27 is fixed to the top of the operating lever. A short distance above the fulcrum point of the operating lever is a transverse pin 28 fixed to the lever. The numeral 29 indicates a lever for operating the balance-wheel. This lever is fulcrumed to a pin 30 mounted in the brackets 19 and 20 below the pivotal point of the lever 26. The upper end of the lever 29 is provided with a longitudinal slot 31 to receive the pin 28. A pitman 32 is pivoted to the lower end of the lever 29 for purposes hereinafter made clear. Pivoted to the lever 26 is the outer portion 33 of the rack-bar. It is provided, near its inner end, with a plate 34. Within this plate 34 is mounted the flattened pin 35 designed to enter a slot 37 in the adjacent end of the rack-bar. The aid pin 35 is provided with an operating lever 36, thus providing means for detachably connecting the portions of the rack-bar. The inner end portion of the rack-bar is indicated by the numeral 38 and it is normally in mesh with the pinion 16 and guided in its sliding movement by the bracket 14. When it is desired to raise the hinged cover 13, the operator manipulates the lever 34 and then withdraws the rack-bar 38 out of engagement with the pinion 16, then the cover may be raised.

Secured to the under surface of the tub is the flat ring 39 to which the brace 40 is fixed. This brace curves downwardly and under the center of the tub and serves to support the bolt 41 upon which the sleeve 42 is mounted. Formed on the sleeve 42 is a hub 43 in which a shaft 44 is rotatably mounted and fixed to the said shaft is a large beveled pinion 45. This pinion 45 is provided with a wrist-pin 46 to which the pitman 32 is pivoted. Mounted in the top of the sleeve 42 is a shaft 47 upon which we have fixed a small beveled pinion 48 and a large balance-wheel 49. The pinion 48 meshes with the pinion 45 and the balance-wheel 49 is arranged in a substantially horizontal position parallel with the bottom of the tub and contained within and protected by the bar 40.

In practical use and assuming that a reciprocating motion is imparted by the operator to the handle 27, the rack-bar 38 will operate to impart an alternating rotary motion to the agitator 17 and the pitman 32 will impart a continuous rotary motion, at a relatively high speed, to the balance-wheel 49. On account of the position of the balance-wheel, it may safely be rotated at a high rate of speed because it is protected by the legs 25ª and the brace rods 40. Furthermore a relatively large and heavy balance-wheel may be conveniently used on a tub of this class because it is located beneath the tub and does not project beyond the tub. Hence the balance-wheel will not in any way interfere with the handling and transporting of the machine.

By having the balance wheel connected with a small gear wheel in mesh with a large gear wheel, which latter is connected by a pitman with the operating device that imparts an alternating rotary motion to the agitator, I am enabled to arrange said mechanism upon the washing machine body to the best advantage, and a well balanced and smooth running machine is thereby provided.

In machines of this class, it is desirable that the operating lever may be reciprocated at a relatively slow speed. It is also desirable that the agitator be given an alternating reciprocating motion at a relatively slow speed. However, the balance-wheel, in order to properly perform its function, must be rotated continuously in one direction at a relatively high speed. By the arrangement and combination herein set forth, all of these desirable results are accomplished and assuming that the operator is imparting a reciprocating motion to the operating lever and assuming that the balance-wheel has attained a considerable momentum, then the operator may if he desires push the operating lever away from him and then permit the balance-wheel to carry the lever through the remainder of its stroke or if desired he may impart motion to the operating lever only when it is moving toward him and if the agitator encounters any obstruction which would tend to stop the reciprocation of the operating lever, then the balance-wheel will carry it over and the operator need only apply power in any desired manner to each stroke of the lever and the motion of the agitator may be maintained continuously, even though at times the agitator encounters more obstruction than at other times. Hence the operator may run a machine for a relatively great length of time without tiring. By having the two levers 26 and 29 arranged as set forth, several desirable results are attained: First, in packing and shipping the machines, the levers 26 and 29 may be detached from their supporting brackets and will occupy a smaller space than though a single lever were used and furthermore by the arrangement of the said levers as shown, the handle 27 may be moved in a relatively short path of travel and the necessary length of stroke will be imparted to the lower end of the lever 29.

Having thus described our invention, what we claim and desire to secure by Letters Patents of the United States, therefor is—

1. The combination of a washing machine body, an agitator, a lever, means connected with the lever for imparting an alternating rotary motion to the agitator, a pitman connected with the lever, a large gear wheel connected with the pitman, a small gear wheel in mesh with the large one, and a balance wheel connected with the small gear wheel.

2. The combination of a washing machine body, an agitator, a pinion on the agitator shaft, a balance wheel arranged in a plane parallel with that of said pinion, a small pinion connected with the balance wheel, a large pinion in mesh with the small one and an operating device including a rack in mesh with the pinion on the agitator and a pitman connected to the large gear wheel.

3. The combination of a washing machine body, an agitator mounted in the top thereof, a balance wheel beneath the bottom thereof, a reciprocating lever, means connected with the lever for imparting an alternating rotary motion to the agitator and means connected with the lever for imparting a continuous rotary motion to the balance wheel, said means including a speed increasing gearing device.

4. A washing machine body, an agitator mounted in its top, a balance wheel under the body and an operating device passed around the side of the body and connecting the agitator and balance wheel and capable of operating both, said operating device including a speed increasing gearing for the balance wheel.

5. The combination of a washing machine body, an agitator mounted in the top thereof, a balance wheel mounted beneath the bottom thereof, two connected levers at the side of the body, the upper one fulcrumed to the body, means connected with the upper lever for imparting an alternating rotary motion to the agitator, the lower lever fulcrumed to the machine body and pivotally and slidingly connected with the upper one and means connected with the lower lever for imparting a continuous rotary motion to the balance wheel.

6. The combination of a washing machine body, an agitator mounted in the top of the body, a brace rod secured beneath the body and extending downwardly below the center of the body, a shaft supported between the brace rod and the bottom of the body, a balance wheel mounted on the shaft, a beveled pinion connected with the balance wheel, a pinion meshed with the said beveled pinion, a lever and means connected with the lever for imparting an alternating rotary motion to the agitator and a continuous rotary motion to the said balance wheel.

7. The combination with a washing machine body, an agitator, a balance wheel, a small gear wheel connected with the balance wheel, a large gear wheel in mesh with the small one, an operating device, means connected with the operating device for imparting an alternating rotary motion to the agitator, a pitman connected to the operating device for driving the large gear wheel, supporting legs for the body, a bar beneath the body, said bar forming a support for the balance wheel and said legs serving to protect the balance wheel and gear wheels.

Des Moines, Iowa, January 7, 1905.

BERT A. STOCKING.
HIRAM MENDENHALL.

Witnesses:
JOE H. ROSS,
GEORGE COSSON.